United States Patent [19]

Vaughan et al.

[11] 4,088,739

[45] * May 9, 1978

[54] PROCESS FOR PREPARING SYNTHETIC FERRIERITE

[75] Inventors: David Evan William Vaughan, Columbia; Grant Campbell Edwards, Silver Spring, both of Md.

[73] Assignee: W. R. Grace & Co., New York, N.Y.

[*] Notice: The portion of the term of this patent subsequent to Jun. 29, 1993, has been disclaimed.

[21] Appl. No.: 699,916

[22] Filed: Jun. 25, 1976

Related U.S. Application Data

[63] Continuation-in-part of Ser. No. 515,380, Oct. 16, 1974, Pat. No. 3,966,883.

[51] Int. Cl.$^2$ ............................................. C01B 33/28
[52] U.S. Cl. .................................... 423/329; 423/328
[58] Field of Search ............... 423/328, 329, 330, 118; 252/455 Z

[56] References Cited

U.S. PATENT DOCUMENTS

| | | | |
|---|---|---|---|
| 2,882,244 | 4/1959 | Milton | 423/328 |
| 3,966,883 | 6/1976 | Vaughan et al. | 423/329 |

OTHER PUBLICATIONS

Barrer et al. "Chemical Society Journal" 1964, Pt. 1, pp. 485-497.

Alietti et al. "The American Mineralogist" vol. 52, 1967, pp. 1562 & 1563.
Kerr, "Nature" vol. 210, Apr. 16, 1966, pp. 294 & 295.
Barrer et al. "J. Chem. Soc." 1948, pp. 2158-2163.
Eberly, "The American Mineralogist" vol. 49, Jan.--Feb. 1964, pp. 30-40.
Barrer et al., "The American Mineralogist" vol. 50, Mar.-Apr., 1965, pp. 484-489.
Wise et al., "The American Mineralogist" vol. 54, 1969, pp. 887-895.

*Primary Examiner*—Edward J. Meros
*Attorney, Agent, or Firm*—Arthur P. Savage; William W. McDowell, Jr.

[57] ABSTRACT

An improved process for preparing synthetic ferrierites having the absorption and catalytic properties characteristic of 5 to 8 angstrom zeolites which comprises promoting an alkaline reaction mixture comprising Group I and/or Group II cations, a source of silica, a source of alumina with lithium cations. The promoted reaction mixture is seeded with natural or synthetic ferrierite seeds, and heated to convert the mass to the synthetic ferrierite.

The product has the empirical formula, 0.1 to 0.9 $Li_2O:0.1:0.9\ R_2O:Al_2O_3:6$ to 25 $SiO_2$ wherein $R_2O$ is $Na_2O$, $K_2O$, or $Rb_2O$ and/or $Cs_2O$; 0.1 to 0.9 $Li_2O:0.1$ to 0.9 $WO:Al_2O_3:6$ to 25 $SiO_2$ wherein WO is BaO, CaO, MgO or SrO; or $(Li_2O:R_2O:WO):Al_2O_3:6-25\ SiO_2$ where $R_2O$ is any $R_2O$ above and WO is any WO above.

12 Claims, No Drawings

PROCESS FOR PREPARING SYNTHETIC FERRIERITE

This application is a continuation-in-part of application Ser. No. 515,380; filed Oct. 16, 1974; how U.S. Pat. No. 3,966,883.

BACKGROUND OF THE INVENTION

This invention relates to the production of synthetic, crystalline ferrierite, an alumino-silicate zeolite. Ferrierite is relatively scarce in nature, but has been found in large deposits in the Western United States. Natural ferrierite has the general formula $(Na, K)_{0.5-4} Ca_{0-1} Mg_{0.5-3}(Al_{4-7} Fe_{0-1} Si_{27-31'})O_{72} \cdot 18-23 H_2O$ where the sum of the moles of alkali and alkaline earth oxides equal the sum of the moles of alumina and ferria, $$\Sigma(Na_2O + K_2O + CaO + MgO) \approx \Sigma(Al_2O_3 + Fe_2O_3), \text{ and } \Sigma(Si + Al + Fe) = 36.$$

Natural ferrierite from Kamloops Lake, British Columbia, Canada has been shown by P. A. Vaughan, Acta Crystallographica 21, 983 (1966), to be orthorhombic with the space group I 2/M 2/M 2/M. Natural ferrierites from various localities do not have exactly the same X-ray powder pattern, but the X-ray powder pattern of ferrierite from each locality fits the theoretically allowed lines for the space group 2/M, 2/M, 2/M, as shown below in Table A, and the differences are presumably caused by variable cation contents. Synthetic strontium ferrierites of the approximate composition $SrO:Al_2O_3: 7-9\ SiO_2$, the X-ray powder patterns of which also fit the allowed lines, have been described in the literature by R. M. Barrer and D. J. Marshall, Journal of the Chemical Society 1964. 485. Synthetic strontium and calcium ferrierite were made at 350°–370° C and 1,020–1,632 atmospheres by D. B. Hawkins, Materials Research Bulletin, 2 951 (1967). Also, synthetic sodium ferrierite was made by E. E. Senderov, Geochemistry (English Translation) 9. 848 (1963). Synthesis of strontium ferrierites by Barrer and Marshall were carried out at temperatures of 260°, 340° and 380° C at pressures of 39, 144 and 235 atmospheres, respectively. Even though such high temperatures as 340° and 380° were employed, the synthesis of strontium ferrierite required 2–4 days. Twenty days were required to crystalize strontium ferrierite from a 1.5 SrO:1.0 $Al_2O_3$:9SiO$_2$:500H$_2$O slurry at 260° C.

The syntheses of stontium ferrierite, reported by Barrer and Marshall, at 340° and 380° C are relatively difficult, and the product ferrierite is frequently contaminated with impurities. By using the seeding technique, described below, we have reduced the temperatures, pressures and times required for synthesis; also we have greatly improved the reliability of the process.

Furthermore, no natural ferrierite has been shown to contain substantial amounts of strontium or lithium or both. Table B shows that samples of natural ferrierite from five localities are mainly sodium, potassium, magnesium, calcium aluminosilicate hydrates, with some possible substitution of iron for aluminum. The compositions of natural ferrierites have recently been reviewed by Wise and Tschernich (American Mineralogist (1976), vol. 61, p. 60–66); they did not find lithium in natural ferrierite samples.

TABLE A

COMPARISON OF D SPACINGS OF TWO NATURAL AND SYNTHETIC STRONITIUM FERRIERITES WITH THE ALLOWED LINES

| FERRIERITE Theoretical for I 2/M 2/M 2/M Where a = 19.16, b = 14.13 and c = 7.49 | | FERRIERITE Kamloops Lake B.C., Canada | | FERRIERITE, Agoura, Ca. | | SYNTHETIC STRONTIUM FERRIERITE* | |
|---|---|---|---|---|---|---|---|
| hkl | dA | dA | Relative Intensity | dA | Relative Intensity | dA | Relative Intensity |
| 110 | 11.37 | 11.3 | 20 | 11.3 | 3 | — | — |
| 200 | 9.58 | 9.61 | 100 | 9.47 | 50 | 9.49 | 75 |
| 020 | 7.06 | 7.00 | 30 | 7.07 | 38 | 7.07 | 20 |
|  |  |  |  | — | — | 6.96 | 15 |
| 101 | 6.98 | 6.61 | 20 | 6.59 | 3 | 6.61 | 55 |
| 011 | 6.62 | 5.84 | 50 | 5.75 | 15 | 5.77 | 15 |
| 310 | 5.82 | — | — | 5.64 | 14 | — | — |
| 220 | 5.69 | — | — | — | — | 5.43 | 5 |
| 211 | 5.44 | 4.96 | 10— | — | — | 4.96 | 15 |
| 121 | 4.964 | — | — | — | — | — | — |
| 301 | 4.860 | 4.80 | 10— | 4.75 | 2 | 4.76 | 15 |
| 400 | 4.790 | 4.58 | 10— | 4.56 | 1 | — | — |
| 130 | 4.574 | — | — | — | — | — | — |
| 321 | 4.004 | 3.99 | 90 | 3.98 | 35 | 3.99 | 45 |
| 031 | 3.987 | — | — | 3.94 | 35 | 3.94 | 35 |
| 420 | 3.965 | 3.88 | 10 | — | — | 3.86 | 25 |
| 411 | 3.880 | 3.791 | 20 | 3.78 | 65 | 3.78 | 50 |
| 330 | 3.791 | — | — | — | — | 3.74 | 10 |
| 002 | 3.745 | 3.69 | 50 | 3.66 | 12 |  |  |
| 510 | 3.698 | — | — | — | — | 3.67 | 30 |
| 231 | 3.681 | 3.54 | 80 | — | — | 3.555 | 10 |
| 112 | 3.557 | — | — | 3.54 | 100 | 3.536 | 90 |
| 040 | 3.532 | 3.49 | 80 | 3.48 | 18 | 3.483 | 100 |
| 202 | 3.488 | 3.42 | 20 | — | — | 3.389 | 15 |
| 501 | 3.411 | 3.31 | 20 | 3.31 | 35 | 3.313 | 20 |
| 240 | 3.314 | 3.20 | 10 | — | — | — | — |
| 600 | 3.193 | 3.15 | 30 | — | — | 3.142 | 55 |
| 141 | 3.152 | — | — | 3.14 | 12 | — | — |
| 312 | 3.149 | 3.07 | 30 | — | — | 3.058 | 45 |
| 521 | 3.072 | — | — | 3.05 | 12 | — | — |
| 431 | 3.064 | 2.97 | 30 | — | — | 2.960 | 25 |
| 530 | 2.972 | — | — | 2.945 | 11 | 2.938 | 25 |
| 402 | 2.950 | 2.90 | 20 | — | — | 2.897 | 35 |
| 620 | 2.910 | 2.72 | 20 | — | — | 2.715 | 30 |
| 422 | 2.722 | 2.64 | 20 | 2.644 | 7 | 2.646 | 15 |
| 051 | 2.644 | 2.58 | 30 | 2.582 | 10 | 2.583 | 10 |

TABLE A-continued
COMPARISON OF D SPACINGS OF TWO NATURAL AND SYNTHETIC STRONTIUM FERRIERITES WITH THE ALLOWED LINES

| FERRIERITE Theoretical for I 2/M 2/M 2/M Where a = 19.16, b = 14.13, and c = 7.49 | | FERRIERITE Kamloops Lake B.C., Canada | | FERRIERITE, Agoura, Ca. | | SYNTHETIC STRONTIUM FERRIERITE* | |
|---|---|---|---|---|---|---|---|
| hkl | dA | dA | Relative Intensity | dA | Relative Intensity | dA | Relative Intensity |
| 350 | 2.584 | — | — | — | — | — | — |
| 701 | 2.571 | | | | | | |

*Barrier and Marshall, American Mineralogist 50, 484 (1965)

TABLE B
Chemical Analysis of Natural Ferrierite*

| Locality Oxide | Itomuka, Japan Yajima et al.(1971) | Kamloops Lake, Graham (1918) | Albero Bassi, Alietti (1967) | Agoura,** Calif. | Agoura,** Calif. | Sonora Pass,** Calif |
|---|---|---|---|---|---|---|
| $SiO_2$ | 71.21 | 69.13 | 56.80 | 74.40 | 75.64 | 66.17 |
| $Al_2O_3$ | 9.84 | 11.44 | 12.71 | 8.51 | 9.39 | 10.71 |
| $Fe_2O_3$ | 0.05 | | 3.29 | 0.04 | 0.01 | 0.99 |
| $TiO_2$ | — | | 0.10 | | | |
| MnO | — | | | | | |
| CaO | — | none | 5.52 | 0.13 | 0.14 | 0.55 |
| MgO | 1.70 | 2.92 | 4.12 | 1.07 | 1.02 | 2.79 |
| $Na_2O$ | 1.59 | 3.97 | 0.27 | 1.91 | 2.33 | |
| $K_2O$ | 2.85 | 0.36 | 0.82 | 2.48 | 2.80 | 1.54 |
| $CO_2$ | — | | 2.84 | | | |
| $H_2O(+)$ | 4.25 | 13.05 | 4.16 | 11.46 | 8.67 | 17.25 |
| $H_2O(-)$ | 8.63 | | 10.15 | | | |
| | 100.12 | 100.87 | 100.79 | 100 | 100 | 100 |

Chemical Formulae of Ferrierite $(Na_{1.32}K_{1.57})Mg_{1.09}(Si_{30.95}Al_{5.03}Fe_{0.01})_{35.99}O_{72.01} \cdot 18.82H_2O$ (Yajima, et al.)
$(Na,K)_4Mg_2(Si_{30}Al_6)O_{72}(OH)_2 \cdot 18H_2O$ (Staples, 1955)
$Na_{1.5}Mg_2Si_{30.5}Al_{5.5}O_{72} \cdot 18H_2$) (Vaughan, 1966)
$K_{0.51}Na_{0.25}Ca_{0.99}Mg_{2.98}(Fe_{1.20}Al_{7.25}Si_{27.50})O_{72} \cdot 23 \cdot 12H_2O$ (Alietti, 1967)
$Na_{1.8}K_{1.4}Mg_{0.6}(Si_{31.6}Al_{4.4})O_{72} \cdot 18H_2O$ (Wise et al., 1969)

*From S. Yajima, et al., Mineralogical Journal, 6 343 (1971).
**W. S. Wise, et al., American Minerologist, 54, 887 (1969).

BRIEF DESCRIPTION OF THE INVENTION

We have found that the preparation of synthetic ferrierites having the X-ray diffraction patterns shown in Table C can be greatly facilitated by promoting the reaction mixtures, consisting of one or more cations of Group 1A (sodium, potassium, rubidium, and cesium) and/or cations of Group II A (magnesium, barium, strontium, and calcium) of the periodic table, with silica, alumina, water, and natural or synthetic ferrierites as seeds, with lithium cations.

The preparation of the lithium, strontium potassium ferrierite; the lithium potassium ferrierite; and the lithium, sodium, potassium ferrierite were discussed in the parent application. The preferred method of preparing the lithium-promoted ferrierite precursor reactant mixtures is to mix a source of Group I and/or Group II cations, such as the hydroxides thereof, with a source of alumina, a source of silica, water, lithium cations and natural or synthetic ferrierite as seeds. For example, the lithium magnesium ferrierite reaction mixture is prepared by mixing lithium hydroxide, magnesium hydroxide, a source of alumina, a source of silica, water, and natural or synthetic ferrierite seeds. The seeds are present in concentration of 0.1 to 10 percent of the reaction mixture of a powdered or natural ferrierite, or a powdered synthetic ferrierite recovered from previous reactions.

We have further discovered that good synthetic ferrierite can be made from natural amorphous volcanic ash, both with and without seeds of natural ferrierite.

The reactions are carried out at a temperature of 90° to 325° C. in enclosed vessels at a pressure of 1 to 120 atmospheres.

It is an object of the invention to prepare a highly siliceous, acid resistant zeolite for sorption, ion exchange, and catalytic uses, especially in acidic systems.

DETAILED DESCRIPTION OF THE INVENTION

The first step of the process is the preparation of the precursor mixture. The particular mixture used, of course, depends on the desired composition of the product. The lithium, sodium, potassium, rubidium, cesium, magnesium, barium, strontium, and calcium cations are preferably added in the form of hydroxides. The hydroxides are preferred since it is essential that the reaction be carried out in an alkaline medium, preferably at a pH of 8 to 14.

The alumina can be added in any hydrated or amorphous form. Alpha-alumina monohydrate and bauxite give satisfactory results, in addition to commercially available alumina sols.

The silica can be added in any form that is finely divided. The silica sols give satisfactory results as do silica gel powders, such as Hi-Sil 215 (a product of PPG Chemicals). Part of the silica and all of the sodium may be added as sodium silicate if the final product is to be a lithium promoted sodium containing ferrierite. Also, both the silica and the alumina may be supplied by pumice or tuff, natural amorphous alumino silicates. Other alkali silicates may also be used as silica sources (eg. potassium, or lithium silicates). The ratios of reactants depends, of course, on the final composition of the mixture. When the product to be recovered is a lithium-barium ferrierite the reactant mixture should have the following ratios of reactants: 0.5–1.5 $Li_2O$:0.25–1.5 $BaO$:$Al_2O_3$:6–30$SiO_2$:50–600$H_2O$. When the ferrierite is a lithium-potassium ferrierite the ratios of reactants should be 0.5–1.5 $Li_2O$:0.5–1.5 $K_2O$:1 $Al_2O_3$:6–30 $SiO_2$:50–600 $H_2O$. Thus, the central feature of the process is the inclusion of lithium cation in the reaction mixture together with cations of sodium, potassium, rubidium, caesium, magnesium, barium, strontium, and calcium, preferably in amounts of 0.1 to 5 times the concentration of other Group I or the Group II cations.

The ferrierite seeds are usually added as a fine powder, preferably about minus 200 mesh. The seeds may be the natural ferrierite mineral, or they may be derived from any portion of a prior preparation. A sample of the natural ferrierite used as seeds from Lovelock, Nevada had the following composition in weight percent:

| | |
|---|---|
| CaO | 1.7 |
| MgO | 1.1 |
| $Fe_2O_3$ | 1.4 |
| $TiO_2$ | 0.1 |
| $K_2O$ | 4.5 |
| $Na_2O$ | 0.7 |
| $Al_2O_3$ | 10.9 |
| $SiO_2$ | 79.6 |

In the preparation the components of the reaction mixture are added in the desired ratio of reactants and the reactants are transferred to a sealed pressure reaction vessel. The temperature is increased to about 180° to 325° C. and the reaction allowed to proceed at autogenous pressure. The synthesis is normally completed in about 1 to 7 days at 300° C., when the strontium is in the sole alkaline earth component. At 250° C. the synthesis takes 2 days. However, when the alkali metal component is a mixture of strontium and lithium, lithium and sodium, strontium or sodium and lithium, the reaction is completed in a period as little as 24 hours at 225° C. The reaction time is from about 12 hours to 7 days with about 1–2 days being preferred in most cases. The temperatures of seeds syntheses are in the range 180° C to 325° C., with 200° to 250° C. being preferred.

The other steps in the preparation are conventional. The product is removed from the reaction vessel and washed free of excess reactants and dried. The washing is preferably carried out with deionized water at a temperature of about 20° to 80° C. Drying is carried out at a temperature of about 105° C. for a period of about 1 hour.

Our invention is illustrated by the following specific but nonlimiting examples.

EXAMPLE 1

A slurry of the oxide ratio 0.5 SrO:0.5 $Li_2O$:1 $Al_2O_3$:10 $SiO_2$:125 $H_2O$ was prepared by blending 51 g. $Sr(OH)_2 \cdot 8H_2O$, 16 g. $LiOH \cdot H_2O$, 149 g. alumina sol, 445 g. silica sol, 263 g. water and 12 g. powdered natural ferrierite. The slurry was heated in a sealed steel reaction vessel for 1 day at 250° C. The product was found to be good quality ferrierite.

The chemical analysis was as follows:

| | |
|---|---|
| SrO | 4.1% |
| $Li_2O$ | 2.3% |
| $K_2O$ | 0.2% |
| $Al_2O_3$ | 14.5% |
| $SiO_2$ | 78.9% |

EXAMPLE 2

A slurry of the oxide ratio $Li_2O$:$Al_2O_3$:10$SiO_2$:125 $H_2O$ was prepared by mixing 12 g. powdered natural ferrierite, 32.5 g. $LiOH \cdot H_2O$, 150 g. alumina sol, 449 g. silica sol and 302 g. water. The slurry was heated in a sealed steel reaction vessel at 250° C for 1 day. The product was ferrierite and had the following chemical analysis:

| | |
|---|---|
| $Li_2O$ | 5.4% |
| $K_2O$ | 0.2% |
| $Al_2O_3$ | 13.4% |
| $SiO_2$ | 81.0% |

EXAMPLE 3

A slurry was prepared by the same procedure as in Example 2 to achieve the oxide ratio $Li_2O$:$Al_2O_3$:10 $SiO_2$:125 $H_2O$. The slurry was reacted in a sealed steel reaction vessel at 225° C for 1 day. The product was found to be ferrierite.

The chemical analysis was as follows:

| | |
|---|---|
| $Li_2O$ | 5.3% |
| $K_2O$ | 0.2% |
| $Al_2O_3$ | 15.5% |
| $SiO_2$ | 79.0% |

EXAMPLE 4

A slurry of the oxide ratio $Li_2O$:$Al_2O_3$:10$SiO_2$:125 $H_2O$ was prepared using the same ingredients as in Example 2. The slurry was reacted in a sealed steel reaction vessel at 200° C. A good yield of ferrierite was obtained in 5 days.

EXAMPLE 5

A slurry was prepared from 17 g. −325 mesh powdered natural ferrierite, 11 g. NaOH, 34.7 g. $LiOH \cdot H_2O$, 209 g. alumina sol, 636 g. silica sol and 437 g. $H_2O$. The slurry oxide ratio was 0.75 $Li_2O$: 0.25 $Na_2O$: $Al_2O_3$:10 $SiO_2$:125 $H_2O$. The slurry was sealed into a steel reaction vessel, and the vessel heated at 225° C for 1 day. The crystallized product was found to be good quality ferrierite. The chemical analysis was as follows:

| | |
|---|---|
| $Li_2O$ | 3.6% |
| $Na_2O$ | 2.5% |
| $K_2O$ | 0.2% |
| $Al_2O_3$ | 14.8% |
| $SiO_2$ | 78.9% |

EXAMPLE 6

A lithium-barium ferrierite was prepared from a slurry having the following oxide ratio: 0:5$Li_2O$:0.5 $BaO$:1$Al_2O_3$:10$SiO_2$:125$H_2O$. The slurry was made by mixing 26 g barium hydroxide octahydrate with a solution of 7 g lithium hydroxide monohydrate in 154 g water. This was added with blending to a mixture of 250 g silica sol (commercially available Ludox HS-40, 40% $SiO_2$ and 60% $H_2O$) and 74 g alumina sol (commercially available Q-Loid A-30 from the Philadelphia Quartz Co.) Finally 2.7 g natural ferrierite from Lovelock, Nevada, powdered to −325 mesh, was added as seeds; the seeds supply approximately 2.5% of the slurry alumina.

The slurry was mixed well in a Hobart blender, then placed in steel reaction vessels. The vessels were sealed and heated at 250° C in an oven. After 48 hours the vessel was removed from the oven, cooled and opened. The product, a white slurry, was washed free of excess alkalinity with hot deionized water and oven dried at 105° C. The dried powder was X-rayed by the powder diffraction method using copper radiation. The X-ray powder pattern showed the product to be a high purity ferrierite; the pattern is shown in Table C.

having the oxide ratio of $0.75Li_2O:0.25BaO: 1Al_2O_3:10SiO_2:125H_2O$. The paste was transferred to pressure vessels and heated at 250° C. After 2 days (48 hours) at 250° C the product recovered was shown by its X-ray powder pattern to be a well crystallized, pure ferrierite.

A chemical analysis gave the following composition of the calcined ferrierite.

| | |
|---|---|
| $Na_2O$ | 0.1 |
| $Li_2O$ | 2.5 |
| $K_2O$ | 0.1 |
| BaO | 4.6 |
| $Al_2O_3$ | 13.0 |
| $SiO_2$ | 79.7 |
| | 100.0 |

Table C

X-ray Powder Patterns of Synthetic Lithium, $M^+$, $M^{++}$-Ferrierites

| Example No. | 6 Lithium,Barium | | 8 Lithium,Potassium | | 10 Lithium,Sodium,Calcium | | 15 Lithium, Strontium | |
|---|---|---|---|---|---|---|---|---|
| Ferrierite Cations hkl | dA | Relative Intensity | dA | Relative Intensity | dA | Relative Intensity | dA | Relative Intensity |
| 110 | 11.5 | 6 | 11.5 | 3 | — | — | 11.2 | 2 |
| 200 | 9.48 | 72 | 9.46 | 95 | 9.44 | 95 | 9.36 | 90 |
| 020 | 7.06 | 37 | 7.05 | 34 | 7.01 | 24 | 6.96 | 24 |
| 101 | 6.96 | 6 | 6.95 | 6 | 6.94 | 24 | 6.90 | 18 |
| 011 | 6.59 | 24 | 6.58 | 14 | 6.56 | 29 | 6.54 | 27 |
| 310 | 5.75 | 6 | 5.76 | 8 | 5.74 | 12 | 5.72 | 11 |
| 220 | 5.65 | 26 | 5.65 | 11 | 5.64 | 9 | 5.63 | 13 |
| 211 | 5.43 | 1 | — | — | — | — | 5.40 | 4 |
| 121,301 | 4.82 | 5 | — | — | — | — | 4.82 | 5 |
| 400 | 4.74 | 2 | 4.72 | 3 | 4.74 | 4 | 4.69 | 4 |
| 130 | 4.60 | 3 | — | — | — | — | 1' | — |
| 321,031 | 3.98 | 29 | 3.96 | 33 | 3.97 | 17 | 3.96 | 60 |
| 420 | 3.93 | 17 | 3.94 | 10 | 3.93 | 35 | 3.91 | 45 |
| 411 | 3.84 | 14 | 3.84 | 11 | 3.85 | 14 | 3.83 | 17 |
| 330 | 3.77 | 46 | 3.77 | 46 | 3.77 | 35 | 3.75 | 45 |
| 002 | 3.73 | 3 | — | — | 3.73 | 12 | — | — |
| 510,231 | 3.66 | 24 | 3.66 | 10 | 3.66 | 20 | 3.64 | 24 |
| 112,040 | 3.54 | 100 | 3.53 | 100 | 3.53 | 100 | 3.52 | 100 |
| 202 | 3.47 | 82 | 3.47 | 69 | 3.47 | 95 | 3.46 | 95 |
| 501 | 3.38 | 13 | 3.37 | 6 | 3.38 | 8 | 3.36 | 13 |
| 240,022 | 3.31 | 10 | 3.32 | 11 | 3.31 | 20 | 3.29 | 16 |
| 141 | 3.13 | 39 | 3.14 | 35 | 3.13 | 47 | 3.12 | 38 |
| 521,431 | 3.05 | 30 | 3.05 | 11 | 3.05 | 21 | 3.03 | 33 |
| 530 | 2.97 | 5 | — | — | 2.96 | 7 | 2.94 | 8 |
| 402 | 2.95 | 5 | 2.95 | 4 | 2.94 | 5 | 2.92 | 6 |
| 620 | 2.90 | 13 | 2.91 | 10 | 2.90 | 14 | 2.88 | 11 |
| 422 | 2.72 | 10 | 2.72 | 8 | 2.72 | 10 | 2.69 | 13 |
| 051 | 2.66 | 3 | 2.66 | 1 | 2.65 | 5 | 2.63 | 6 |
| 350 | 2.59 | 3 | 2.59 | 7 | 2.58 | 5 | 2.57 | 5 |

This ferrierite was calcined and chemically analyzed and found to contain the following oxides by weight percent.

| | |
|---|---|
| $Li_2O$ | 1.4 |
| $K_2O$ | 0.2 |
| BaO | 8.6 |
| $Al_2O_3$ | 11.7 |
| $SiO_2$ | 77.4 |
| $Na_2O$ | 0.7 |
| | 100.0 |

The small amount of $K_2O$ is apparently contributed by the natural ferrierite seeds which contain 4.5% $K_2O$.

EXAMPLE 7

This example demonstrates the use of Ludox HS-30 silica sol, a commercially available product, as a silica source for ferrierite synthesis. A mixture of 335 g of silica sol (Ludox HS-30) and 74 g alumina sol (Q-Loid A-30) was blended in a Hobart mixer. To this were added a solution of 11 g lithium hydroxide monohydrate in 76 g water and 13 g finely powdered barium hydroxide octahydrate. Lastly 2.7 g natural ferrierite (from Lovelock, Nevada), powdered to −325 mesh was blended into the slurry which formed a soft paste,

EXAMPLE 8

A lithium-potassium ferrierite resulted from a slurry of the ratio $0.5Li_2O:0.5K_2O:1Al_2O_3:10SiO_2:125H_2O$ heated in a pressure vessel at 250° C for 1 day (24 hours). The slurry was prepared by dissolving 7 g lithium hydroxide monohydrate and 11 g potassium hydroxide in 160 g water. The solution of bases was mixed with 250 g silica sol (Ludox HS-40) and 74 g alumina sol (Q-Loid A-30) in a Hobart mixer. Lastly, 2.7 g powdered natural ferrierite, −325 mesh, was blended in as seeds. The X-ray powder pattern is essentially the same as that found for the product of Example 6. The chemical analysis of the calcined ferrierite was.

| | |
|---|---|
| $Li_2O$ | 2.0 |
| $K_2O$ | 6.0 |
| $Al_2O_3$ | 13.1 |
| $SiO_2$ | 78.9 |
| | 100.0 |

The X-ray powder pattern is shown in Table C. Examples 9 thru 16 were prepared using the same procedures as described in examples 6 thru 8. The data is presented in Table E.

TABLE E

Examples 3-16 gave Ferrierite under various conditions of temperature in pressure vessels as shown below
Chemicals Used In Slurry And Weights

| Example | Slurry Oxide Ratio: 1.0 Al₂O₃ | | | | | | | | | | | Sr(OH)₂-8H₂O | Alumina Source | Silica Sol | | Water | Seeds* | Reaction Temp, °C | Days Required To Obtain A Good Yield of Ferrierite |
|---|---|---|---|---|---|---|---|---|---|---|---|---|---|---|---|---|---|---|---|
| | Li₂O | Na₂O | K₂O | CaO | SrO | BaO | SiO₂ | H₂O | LiOH·H₂O | NaOH | KOH | Ca(OH)₂ | | | | Source | | | | |
| 9 | 0.75 | — | 0.25 | — | — | — | 10 | 125 | 10.5g | — | 5.5g | — | — | 74g Q-Loid A-30 | 250g Ludox HS-40 | 160g | 2.7g | 250 | 2 |
| 10 | 0.5 | 0.25 | — | 0.25 | — | — | 10 | 125 | 7g | 3.4g | — | 3.1g | — | 74g Q-Loid A-30 | 335g Ludox HS-30 | 76g | 2.7g | 250 | 2 |
| 11 | 0.25 | — | — | — | 0.75 | — | 10 | 250 | 3.5g | — | — | — | 33g | 74g Q-Loid A-30 | 693g Nalco E-136 | 80g | 2.7g | 250 | 4 |
| 12 | 0.75 | 0.25 | — | — | — | — | 10 | 250 | 10.5g | 3.4g | — | — | — | 74g Q-Loid A-30 | 693g Nalco E-136 | 96g | 2.7g | 250 | 2 |
| 13 | 0.25 | — | — | — | 0.75 | — | 7 | 125 | 3.5g | — | — | — | 33g | 74g Dispal M** Slurry | 176g Ludox HS-40 | 187g | 2.7g | 300 | 2 |
| 14 | 0.25 | — | — | — | 0.75 | — | 15 | 125 | 3.5g | — | — | — | 33g | 74g Dispal M** Slurry | 376g Ludox HS-40 | 66g | 2.7g | 300 | |
| 15 | 0.25 | — | — | — | 0.75 | — | 20 | 150 | 3.5g | — | — | — | 33g | 74g Dispal M** Slurry | 502g Ludox HS-40 | 67g | 2.7g | 300 | 2 |
| 16*** | 0.5 | — | — | — | 0.5 | — | 10 | 125 | 7g | — | — | — | 22g | 74g Q-Loid A-30 | 250g Ludox HS-40 | 151g | 0.5g | 250 | |

*Natural ferrierite from near Lovelock, Nevada, powdered to −325 mesh.
**Alumina slurry made by dispersing 210g Dispal M (Alumina hydrate from Conoco Chemical Co.) in 490 g water.
***This example demonstrates that only a small amount of seeds are needed for the synthesis of ferrierite.

Chemical Analyses of Synthetic Ferrierites* Containing Lithium

| Example | %Li₂O | %Na₂O | %K₂O | %CaO | %SrO | %BaO | %Al₂O₃ | %SiO₂ | Total |
|---|---|---|---|---|---|---|---|---|---|
| 10 | 1.8 | 2.2 | 0.1 | 2.0 | — | — | 13.5 | 80.3 | 99.9 |
| 11 | 0.7 | — | 0.2 | — | 9.3 | — | 11.6 | 78.2 | 100.0 |
| 13 | 1.0 | — | 0.1 | — | 13.5 | — | 16.4 | 69.1 | 100.1 |
| 14 | 0.6 | 0.4 | 0.1 | — | 6.2 | — | 9.1 | 83.6 | 100.0 |
| 15 | 0.6 | 0.6 | 0.1 | — | 4.7 | — | 7.4 | 86.6 | 100.0 |
| 16 | 1.5 | — | 0.1 | — | 6.6 | — | 13.2 | 78.5 | 99.9 |

*Calcined samples

EXAMPLE 17

A reaction slurry was prepared employing the slurry oxide ratio of $SrO:Al_2O_3:10SiO_2:125H_2O$, seeded with natural ferrierite powder takes the following times to react at various temperatures.

| Temp. °C | Days for Good Yield of Ferrierite |
|---|---|
| 190 | 23 |
| 200 | >11 |
| 225 | 5 |

In contrast the slurries employing the oxide ratio $Li_2O:Al_2O_3:10SiO_2:125H_2O$ produce a good yield of ferrierite in the following times at various temperatures.

| Temp. °C | Days for Good Yield of Ferrierite | Example No. |
|---|---|---|
| 200 | 5 | 23 |
| 225 | 1 | 22 |

Thus, the synthesis of lithium ferrierite is much more rapid than the synthesis of strontium ferrierite at 200° and 225° C, making the synthesis of lithium ferrierite a more commercially useful process.

EXAMPLE 18

This example demonstrates the acid stability of lithium ferrierite. A sample of lithium ferrierite was prepared by the method of Example 2. This lithium ferrierite was then boiled with 0.6M hydrochloric acid using 20 g ferrierite and 200 ml 0.6M hydrochloric acid for ½ hour. The product was washed free of acid, dried and calcined at 1400° F for 3 hours. The nitrogen surface area after the above treatment was 273 m²/g as measured on a Perkin-Elmer Shell sorptometer. Another 20 g sample of lithium ferrierite was boiled in 20ml 0.6M hydrochloric acid for ½ hour, the acid filtered off and the ferrierite boiled another ½ hour in a fresh portion of 0.6M hydrochloric acid. Then the ferrierite was washed free of acid, dried and calcined at 1200° F for 3 hours. The nitrogen surface area was 265 m²/g.

The following examples demonstrate that ferrierite cannot be synthesized by our methods if slurries of the ratio $M_2O/MO:1Al_2O_3:8-10SiO_2:100-125H_2O$ are reacted employing powdered ferrierite as seeds without the addition of some lithium. Examples 19–24 illustrate the results obtained without the addition of lithium (Table F). Most of the products of these experiments are dense phases (quartz, feldspar, and analcine), and clearly show, by reference to previous examples, that the addition of lithium to the synthesis slurry clearly has a promoting effect that directs the synthesis to ferrierite products.

TABLE F
Examples 19–24 Which Demonstrate That Ferrierite Is Not Obtained Without Lithium

| Ex. No. | Slurry Ratio:1Al₂O₃ | Cation Source | Alumina Source[1] | Silica Source[2] | Water | Seeds[3] | Reaction Temp., °C | Products |
|---|---|---|---|---|---|---|---|---|
| 19 | BaO:10SiO₂:125H₂O | Ba(OH)₂·8H₂O, 53g | 74g | 251g | 147g | 2.8g | 250 | One day: Ba feldspar<br>Four days: Ba feldspar |
| 20 | Na₂O:10SiO₂:125H₂O | NaOH, 14g | 74g | 251g | 165g | 2.8g | 250 | One day: mordenite<br>Four days: mordenite & analcime |
| 21 | 2Na₂O:10SiO₂:125H₂O | NaOH, 28g | 74g | 251g | 162g | 2.8g | 250 | One day: analcime and quartz<br>Four days: analcime and quartz |
| 22 | 1.0Na₂O:1.0K₂O:10SiO₂:125H₂O | NaOH, 14g KOH, 22g | 74g | 251g | 162g | 2.8g | 250 | One day: quartz and feldspar<br>Four days: quartz and feldspar |
| 23 | K₂O:10SiO₂:125H₂O | KOH, 32g | 125g | 420g | 162g | 9g | 250 | One day: quartz<br>Four days: quartz |
| 24 | CaO:8SiO₂:100H₂O | Ca(OH)₂, 41g | 237g | 629g | 414g | 17g | 300 | One day: amorphous gel<br>Eight days: amorphous gel |

[1]A commercial alumina sol, Q-Loid A-30, was used.
[2]A commercial silica sol, Ludox HS-40, was used.
[3]Natural ferrierite from near Lovelock, Nevada, powdered to −325 mesh.

What is claimed is:

1. A process for preparing synthetic ferrierite which comprises:
   (a) preparing an alkaline reaction mixture which contains Group I and/or Group II cations, a source of alumina, a source of silica, water, powdered ferrierite seeds and promotional amounts of lithium cations; and
   (b) heating the reaction mixture at a temperature of about 180° to 325° C to form ferrierite.

2. The process of claim 1 wherein said reaction mixture contains powdered, natural, or synthetic ferrierite seeds in a concentration of 0.1 to 10% by weight.

3. The process of claim 1 wherein said heating step is conducted at superatmospheric pressure.

4. The process of claim 1 wherein said reaction is conducted at autogenous pressure.

5. The process of claim 1 wherein the reaction mixture has the formula:

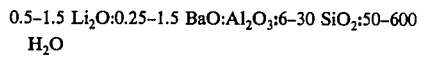

0.5–1.5 Li₂O:0.25–1.5 BaO:Al₂O₃:6–30 SiO₂:50–600 H₂O

6. The process of claim 1 wherein the reaction mixture has the formula:

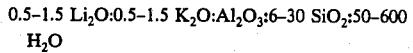

0.5–1.5 Li₂O:0.5–1.5 K₂O:Al₂O₃:6–30 SiO₂:50–600 H₂O

7. The process of claim 1 wherein the Group I and/or Group II cations are derived from hydroxides of sodium, potassium, rubidium, caesium, magnesium, barium, strontium, and calcium.

8. In a process for preparing synthetic ferrierite wherein an alkaline reaction mixture containing Group I and/or Group II cations, a source of alumina, a source of silica, water and powdered ferrierite seeds is heated to form ferrierite, the improvement comprising:
   adding promotional amounts of lithium cations to the reaction mixture.

9. The process according to claim 8, wherein the Group I and Group II cations are added to the reaction mixture as the hydroxides.

10. The process according to claim 8, wherein the reaction mixture contains powdered, natural or synthetic ferrierite seeds in a concentration of 0.1 to 10 weight percent.

11. The process according to claim 8, wherein the silica and alumina sources are silica and alumina sols.

12. The process according to claim 8, wherein the lithium cations are present in the reaction mixture in a concentration equal to 0.1 to 5 times the concentration of the Group I or Group II cations.

* * * * *